US012608729B2

(12) United States Patent
Tobin

(10) Patent No.: US 12,608,729 B2
(45) Date of Patent: *Apr. 21, 2026

---

(54) USER CUSTOMIZABLE WEB ADVERTISEMENTS

(71) Applicant: eBay Inc., San Jose, CA (US)

(72) Inventor: John Patrick Edgar Tobin, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,803

(22) Filed: May 25, 2023

(65) Prior Publication Data

US 2023/0385881 A1      Nov. 30, 2023

Related U.S. Application Data

(63) Continuation of application No. 17/736,171, filed on May 4, 2022, now Pat. No. 11,694,236, which is a
(Continued)

(51) Int. Cl.
  *G06Q 30/02*        (2023.01)
  *G06Q 30/0241*      (2023.01)
  *H04L 67/02*        (2022.01)

(52) U.S. Cl.
  CPC ......... *G06Q 30/0276* (2013.01); *H04L 67/02* (2013.01)

(58) Field of Classification Search
  None
  See application file for complete search history.

(56) References Cited

U.S. PATENT DOCUMENTS 7,028,072 B1 * 4/2006 Kliger .................... G06Q 30/02
                                                    709/217
8,712,845 B2   4/2014 Christiansen et al.
                  (Continued)

FOREIGN PATENT DOCUMENTS

WO      2016022774        2/2016

OTHER PUBLICATIONS

Anonymous Authors; Altering an Experience of a User, Based on Information Associated with a Party by May 22, 2008 (IP.com) (Year: 2008).*

(Continued)

*Primary Examiner* — Rashida R Shorter
(74) *Attorney, Agent, or Firm* — SCHWEGMAN LUNDBERG & WOESSNER, P.A.

(57)               ABSTRACT

A system and method of providing user customizable web advertisements are disclosed. In some embodiments, the system may include a non-transitory, computer-readable medium storing computer-executable instructions and one or more processors. When the one or more processors execute the computer-executable instructions, the processors may be configured to receive a customizable advertisement, the customizable advertisement having at least one customizable portion. When a customizable portion is selected, the one or more processors may display a plurality of customization options for the at least one customizable portion. The one or more processors may be further configured to receive a selection of a customization option from the plurality of customization options. The one or more processors may then apply the selected customization option to the customizable portion of the customizable advertisement. Afterwards, the one or more processors may then display the customizable advertisement with the selected customization option.

20 Claims, 14 Drawing Sheets

Related U.S. Application Data continuation of application No. 14/453,349, filed on Aug. 6, 2014, now Pat. No. 11,341,542.

(56) References Cited

U.S. PATENT DOCUMENTS

| | | | |
|---|---|---|---|
| 8,719,101 | B1 | 5/2014 | Booth et al. |
| 8,726,311 | B2 | 5/2014 | Ward, III et al. |
| 8,732,757 | B2 | 5/2014 | Ward, III et al. |
| 8,744,906 | B2 | 6/2014 | Fordyce, III et al. |
| 8,745,226 | B2 | 6/2014 | Harinstein et al. |
| 8,751,307 | B2 | 6/2014 | Gross |
| 9,032,298 | B2 | 5/2015 | Segal et al. |
| 9,053,189 | B2 | 6/2015 | Hoag et al. |
| 11,341,542 | B2 | 5/2022 | Tobin |
| 11,694,236 | B2 | 7/2023 | Tobin |
| 2003/0191816 | A1 | 10/2003 | Landress et al. |
| 2005/0097190 | A1* | 5/2005 | Abdelhak ............. G06F 16/954 709/227 |
| 2009/0013037 | A1 | 1/2009 | Bodmer et al. |
| 2010/0082440 | A1 | 4/2010 | Vaidyanathan et al. |
| 2010/0198825 | A1 | 8/2010 | Chan et al. |
| 2011/0153612 | A1* | 6/2011 | Paul .................... G06F 16/9577 709/224 |
| 2011/0173071 | A1* | 7/2011 | Meyer .................... G06Q 30/02 705/14.54 |
| 2012/0054609 | A1 | 3/2012 | Sher Sever et al. |
| 2013/0036351 | A1* | 2/2013 | King .................... G06F 16/972 715/234 |
| 2013/0097158 | A1 | 4/2013 | Pobbathi et al. |
| 2013/0097168 | A1 | 4/2013 | Chang et al. |
| 2013/0159445 | A1* | 6/2013 | Zonka ................ G06Q 10/1093 709/206 |
| 2013/0311274 | A1 | 11/2013 | Ashok et al. |
| 2014/0108128 | A1 | 4/2014 | Patel et al. |
| 2014/0114758 | A1 | 4/2014 | Bentley |
| 2014/0137188 | A1 | 5/2014 | Bartholomay et al. |
| 2014/0149227 | A1 | 5/2014 | Hoyle |
| 2014/0156398 | A1 | 6/2014 | Li et al. |
| 2014/0380149 | A1 | 12/2014 | Gallo et al. |
| 2015/0294358 | A1 | 10/2015 | Galadari et al. |
| 2016/0042408 | A1 | 2/2016 | Tobin |
| 2022/0270140 | A1 | 8/2022 | Tobin |

OTHER PUBLICATIONS

Shaikh, Baber M. et al., "Customized User Segments For Ad Targeting" Jul. 29, 2009, Ip.com Journal (Year: 2009).*

"International Application Serial No. PCT US2015 043972, International Search Report mailed Nov. 6, 2015", 2 pgs.

"International Application Serial No. PCT US2015 043972, Written Opinion mailed Nov. 6, 2015", 6 pgs.

"International Application Serial No. PCT US2015 043972, International Preliminary Report on Patentability mailed Feb. 16, 2017", 8 pgs.

"U.S. Appl. No. 14/453,349, Non Final Office Action mailed Jul. 25, 2017", 16 pgs.

"U.S. Appl. No. 14/453,349, Final Office Action mailed Feb. 23, 2018", 28 pgs.

"U.S. Appl. No. 14/453,349, Non Final Office Action mailed Sep. 10, 2018", 26 pgs.

"U.S. Appl. No. 14/453,349, Final Office Action mailed Jan. 25, 2019", 26 pgs.

"U.S. Appl. No. 14/453,349, Advisory Action mailed Apr. 15, 2019", 3 pgs.

"U.S. Appl. No. 14/453,349, Non Final Office Action mailed May 14, 2019", 31 pgs.

"U.S. Appl. No. 14/453,349, Final Office Action mailed Dec. 5, 2019", 23 pgs.

"U.S. Appl. No. 14/453,349, Examiner Interview Summary mailed Mar. 6, 2020", 3 pgs.

"U.S. Appl. No. 14/453,349, Non Final Office Action mailed Jun. 17, 2020", 30 pgs.

"U.S. Appl. No. 14/453,349, Examiner Interview Summary mailed Sep. 28, 2020", 3 pgs.

"U.S. Appl. No. 14/453,349, Final Office Action mailed Jan. 4, 2021", 32 pgs.

"U.S. Appl. No. 14/453,349, Examiner Interview Summary mailed Mar. 22, 2021", 2 pgs.

"U.S. Appl. No. 14/453,349, Examiner Interview Summary mailed Oct. 14, 2021", 2 pgs.

"U.S. Appl. No. 14/453,349, Notice of Allowance mailed Jan. 20, 2022", 9 pgs.

"Altering An Experience Of A User, Based On Information Associated With A Party", (May 22, 2008).

"U.S. Appl. No. 17/736,171, Notice of Allowance mailed Feb. 21, 2023", 10 pgs.

* cited by examiner 120 and 122

| | | |
|---|---|---|
| Publication Application 200 | Auction Application(s) 202 | Fixed-Price Application(s) 204 |
| Store Application(s) 206 | Reputation Application(s) 208 | Personalization Application(s) 210 |
| Internationalization Application(s) 212 | Navigation Application(s) 214 | Imaging Application(s) 216 |
| Listing Creation (Seller) Application(s) 218 | Listing Management (Seller) Application(s) 220 | Post-Listing Management Application(s) 222 |
| Dispute Resolution Application(s) 224 | Fraud Prevention Application(s) 226 | Messaging Application(s) 228 |
| Merchandizing Application(s) 230 | Loyalty Promotion Application(s) 232 | |

FIG. 2

USER CUSTOMIZABLE WEB ADVERTISEMENTS

CLAIM OF PRIORITY

This application is a Continuation of U.S. application Ser. No. 17/736,171, filed May 4, 2022, which is a Continuation of U.S. application Ser. No. 14/453,349, filed Aug. 6, 2014, which is hereby incorporated by reference in its entirety.

TECHNICAL FIELD

The present application relates generally to the technical field of providing user customizable advertisements, and, in various embodiments, to systems and methods of providing user customizable advertisements that have customizable and non-customizable portions, and sharing and/or publishing a user customizable advertisement after having been customized.

BACKGROUND

Web advertisements suffer from the lack of an incentive for the user to interact with the advertisement, which often results in the user ignoring the advertisement. Accordingly, increasing a user's interest in an advertisement would result in the user being more likely to interact with the advertisement and potentially purchase the product and/or service being advertised.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 2 illustrates exemplary applications executable by one or more application servers according to aspects of the disclosure.

DETAILED DESCRIPTION

Figure 1:
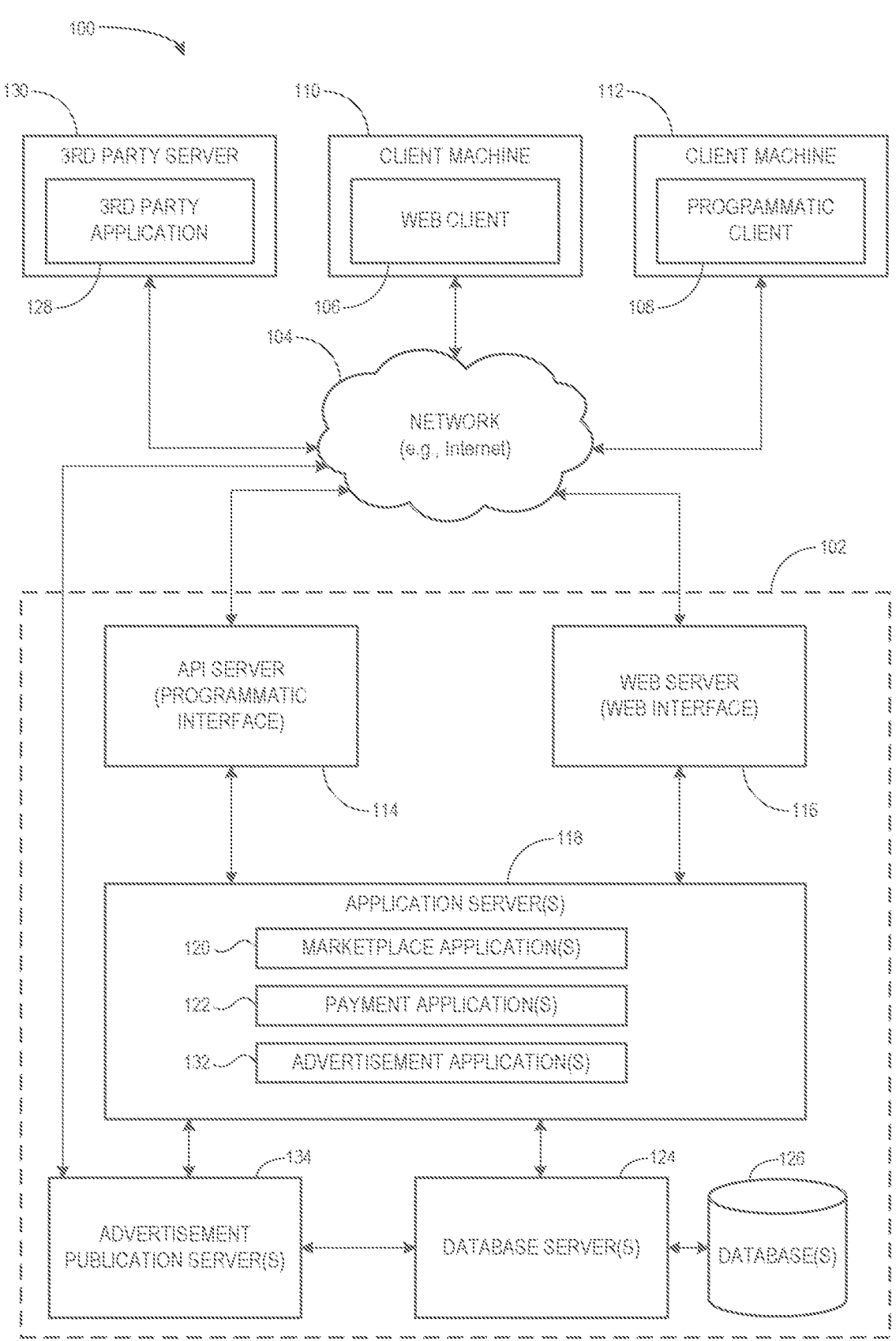
FIG. 1 illustrates a network architecture of an exemplary system according to aspects of the disclosure.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure is directed to systems and methods for providing user customizable web advertisements. One of the challenges in providing advertisements to users is providing an advertisement that engages the user and encourages the user to select the advertisement, thereby presenting the advertised product and/or service to the user. Traditionally, an advertisement presented on a web page includes non-customizable elements, e.g., an image, a sound, text, and other such non-customizable elements. The systems and methods disclosed herein provide a mechanism by which a user customizable advertisement may be deployed and, further, how the advertisement may be shared or published to other users after the advertisement is customized.

In one embodiment a computer-implemented method is disclosed that may include receiving, by at least one processor, a customizable advertisement, the customizable advertisement having at least one customizable portion and displaying, by a display in communication with the at least one processor, a plurality of customization options for the at least one customizable portion. The 444 method may also include receiving, by an input interface in communication with the at least one processor, a selection of a customization option from the plurality of customization options and applying the selected customization option to the customizable portion of the customizable advertisement. The method may further include displaying the customizable advertisement with the selected customization option.

In another embodiment, the at least one customizable portion may include a soundtrack playable by the at least one processor during the display of the customizable advertisement.

In a further embodiment, the plurality of customization options may include a plurality of songs, and applying the selected customization option to the at least one customizable portion of the customizable advertisement comprises playing a song selected from the plurality of songs as the soundtrack for the customizable advertisement.

In yet another embodiment of the method, the at least one customizable option comprises an animation path that a graphical element of the customizable advertisement follows during the display of the customizable advertisement.

In yet a further embodiment of the method, the plurality of customization options includes a plurality of locations within the customizable advertisement where the graphical element is displayable during the display of the customizable advertisement.

In another embodiment of the method, the customizable advertisement is selected based on one or more items being sold at an electronic marketplace that a user has previously viewed.

In a further embodiment of the method, the method may include receiving a selection to publish the customizable advertisement with the selected customization option, the selection to publish the customizable advertisement causing the at least one processor to transmit which customization option was selected to a publication server, the publication server providing the customizable advertisement with the customization option to one or more users for viewing.

In yet another embodiment of the method, the method may include receiving a selection to share the customizable advertisement with the selected customization option, the selection to share the customizable advertisement causing the at least one processor to display a Uniform Resource Locator where the customizable advertisement with the selected customization option is accessible by one or more users.

The following disclosure also provides for a system that may include a non-transitory, computer-readable medium storing computer-executable instructions and one or more processors that, having executed computer-executable instructions, are configured to receive a customizable advertisement, the customizable advertisement having at least one customizable portion, and display, by a display in communication with the one or more processors, a plurality of customization options for the at least one customizable portion. The one or more processors may be further configured to receive, by an input interface in communication with the one or more processors, a selection of a customization option from the plurality of customization options. In addition, the one or more processors may be configured to apply the selected customization option to the customizable portion of the customizable advertisement and display the customizable advertisement with the selected customization option.

In another embodiment of the system, the at least one customizable portion comprises a soundtrack playable by the one or more processors during the display of the customizable advertisement.

In a further embodiment of the system, the plurality of customization options include a plurality of songs, and applying the selected customization option to the at least one customizable portion of the customizable advertisement comprises playing a song selected from the plurality of songs as the soundtrack for the customizable advertisement.

In yet another embodiment of the system, the at least one customizable option comprises an animation path that a graphical element of the customizable advertisement follows during the display of the customizable advertisement.

In yet a further embodiment of the system, the plurality of customization options includes a plurality of locations within the customizable advertisement where the graphical element is displayable during the display of the customizable advertisement.

In another embodiment of the system, the customizable advertisement is selected based on one or more items being sold at an electronic marketplace that a user has previously viewed.

In a further embodiment of the system, the one or more processors are further configured to receive a selection to publish the customizable advertisement with the selected customization option, the selection to publish the customizable advertisement causing the one or more processors to transmit which customization option was selected to a publication server, the publication server providing the customizable advertisement with the customization option to one or more users for viewing.

In yet another embodiment of the system, the one or more processors are configured to receive a selection to share the customizable advertisement with the selected customization option, the selection to share the customizable advertisement causing the one or more processors to display a Uniform Resource Locator where the customizable advertisement with the selected customization option is accessible by one or more users.

A non-transitory machine-readable storage medium is also disclosed, wherein the non-transitory machine-readable storage medium may store a set of instructions that, when executed by at least one processor, causes the at least one processor to perform a method. The method may include receiving, by at least one processor, a customizable advertisement, the customizable advertisement having at least one customizable portion, and displaying, by a display in communication with the at least one processor, a plurality of customization options for the at least one customizable portion. The method may also include receiving, with an input interface in communication with the at least one processor, a selection of a customization option from the plurality of customization options, and applying, with the at least one processor, the selected customization option to the customizable portion of the customizable advertisement. The method may further include displaying, with the display, the customizable advertisement with the selected customization option.

In another embodiment of the non-transitory, computer-readable storage medium, the at least one customizable portion may include a soundtrack playable by the at least one processor during the display of the customizable advertisement, the plurality of customization options may include a plurality of songs, and the method may include applying the selected customization option to the at least one customizable portion of the customizable advertisement comprises playing a song selected from the plurality of songs as the soundtrack for the customizable advertisement.

In another embodiment of the non-transitory, computer-readable storage medium, the at least one customizable option may include an animation path that a graphical element of the customizable advertisement follows during the display of the customizable advertisement, and the plurality of customization options may include a plurality of locations within the customizable advertisement where the graphical element is displayable during the display of the customizable advertisement.

In a further embodiment of the non-transitory, computer-readable storage medium, the method may include receiving a selection to publish the customizable advertisement with the selected customization option, the selection to publish the customizable advertisement causing the at least one processor to transmit which customization option was selected to a publication server, the publication server providing the customizable advertisement with the customization option to one or more users for viewing.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

FIG. 1 is a network diagram depicting a client-server system 100 according to aspects of the disclosure. A networked system 102, in the example forms of a network-based marketplace or publication system, provides server-side functionality, via a network 104 (e.g., the Internet or a Wide Area Network (WAN)) to one or more client machines. FIG. 1 illustrates, for example, a web client 106 (e.g., a browser, such as the Internet Explorer browser developed by Microsoft Corporation of Redmond, Washington State) and a programmatic client 108 executing on respective client machines 110 and 112.

An API server 114 and a web server 116 are coupled to, and provide programmatic and web interfaces respectively to, one or more application servers 118. The application servers 118 host one or more applications, such as a marketplace application 120, a payment application 122, and an advertisement application 132. The application servers 118 are, in turn, shown to be coupled to one or more database servers 124 that facilitate access to one or more databases 126.

The application server 118 may also be in communication with one or more advertisement publication servers 134. An advertisement publication server 134 may facilitate the publication and/or distribution of the user customizable advertisements, such as when a user has finished customizing a customizable advertisement and has indicated a desire to share the customized advertisement with other users. In addition, the advertisement publication server 134 may be in communication with the database server 124 to retrieve and/or store content for a user customizable advertisement. For example, the advertisement publication server 134 may retrieve graphical content, audio content, programmatic content, etc., from the one or more databases 126 via the database server 124. Furthermore, the database server 124 may facilitate the storage and/or retrieval of the customization options selected by a user.

The marketplace application 120 may provide a number of marketplace functions and services to users who access the networked system 102. The payment application 122 may likewise provide a number of payment services and functions to users. The payment application 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace application 120.

The application server 118 may also include an advertisement application 132 to facilitate the deployment and/or display of one or more user customizable advertisements. Thus, when a web page is requested or information about an item of interest is requested (e.g., a product, service, location, etc.), the advertisement application 132 may be configured to provide a customizable advertisement along with the requested web page or information about the item of interest. The user customizable advertisement may include may include various customizable and non-customizable portions. For example, a user customizable advertisement may include graphical content (e.g., fonts, pictures, movies, etc.), audio content (e.g., soundtracks, sound effects, etc.), programmatic content (e.g., timing information, animation paths, etc.), other such types of content, or combinations thereof. The advertisement applications 132 may select one or more user customizable advertisements for display to the user, such as by inserting said one or more user customizable advertisements in a web page to be viewed by the user.

While the marketplace application 120, the payment application 122, and the advertisement application 132, are shown in FIG. 1 to form part of the networked system 102, it will be appreciated that, in alternative embodiments, the applications 120,122,132 may be separate or distinct from the system 102. For example, the payment application 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The marketplace application 120, the payment application 120, the advertisement application 132 could also be implemented as standalone software programs, which do not necessarily have networking capabilities.

The web client 106 may access the marketplace application 120, the payment application, 122, and the advertisement application 132 via the web interface supported by the web server 116. Similarly, the programmatic client 108 may access the various services and functions provided by the applications 120,122,132 via the programmatic interface provided by the API server 114. The programmatic client 108 may, for example, be a seller application (e.g., the TurboLister application developed by eBay Inc., of San Jose, California) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, payment, or advertising functions that are supported by the relevant applications of the networked system 102.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. FIG. 2 illustrates exemplary applications that may be executable by the foregoing application server(s) 118 to support the aforementioned mechanisms. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Furthermore, and referring back to FIG. 1, the advertisement application 132 may leverage one or more of the applications 200-232 in providing customizable advertisements to users. In other words, the advertisement application 132 may invoke or use data gathered by the applications 200-232 in selecting which advertisement to provide to a user or in selecting which customizable options are available to the user. For example, the advertisement application 132 may use customization information obtained by the internationalization applications 212 to determine a region-specific advertisement to provide. Where a user or seller indicates that he/she is located in the United States, the advertisement application 132 may select an advertisement designed for the U.S. consumer. As another example, the advertisement application 132 may leverage the auction applications 202 to obtain information about a product being auctioned, e.g., a vehicle or other item, and select an advertisement that is complementary with the product being auction, e.g., a comparable vehicle or vehicle accessory. As yet a further example, the advertisement application 132 may leverage the store application(s) 206 to select an advertisement that complements the products being sold by a virtual store. Alternatively, in using the information from the store application 206, the advertisement application 132 may select an advertisement that offers a product or service in competition with a product or service being offered by a virtual store.

Furthermore, as the provided advertisement is customizable, the content of the customizable portions of the advertisement may be selected based on the information and/or data obtained from one or more of the applications 200-232. For example, where a customizable portion of the advertisement is a soundtrack, the advertisement application 132 may leverage the internationalization application 212 to provide region-appropriate soundtrack options. Similarly, where the customizable portion of the advertisement is a graphic, the advertisement application 132 may leverage the personalization application 210 and/or the store application 206 to select graphic options that would be desirable to the user (e.g., where the user's history indicates past purchases or views of exotic cars, the customization options may include graphics of various exotic cars).

As the advertisement application 132 is integrated (e.g., directly or indirectly) with the application sever 118, the advertisement application 132 is able to leverage the data obtained from the applications 200-232 and provide contextualized advertisements having customizable portions that are more likely to be relevant to a user (e.g., a buyer or a seller). Thus, the advertisement application provides an advantage over other advertisement distribution mechanisms because it provides customizable advertisements tailored to a specific user or web page being viewed by the user.

Figure 3:
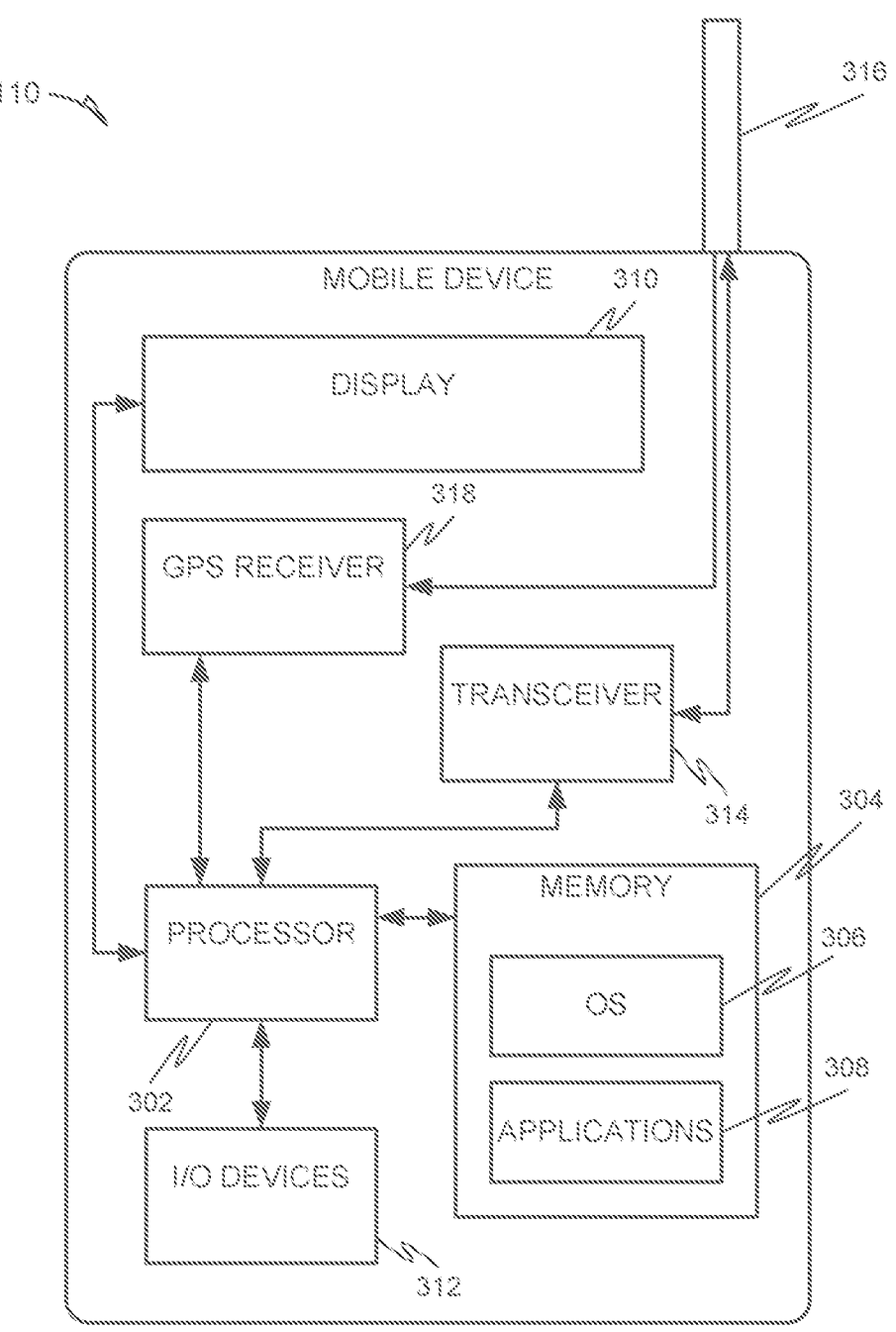
FIG. 3 illustrates an exemplary client machine according to aspects of the disclosure.

FIG. 3 illustrates one example of a client machine 110 in accordance with aspects of the disclosure. In one embodiment, the client machine 110 may be a mobile device. The mobile device may include a processor 302. The processor 302 may be any of a variety of different types of commercially available processors suitable for mobile devices (e.g., an ARM architecture microprocessor, a Microprocessor without Interlocked Pipeline Stages (MIPS) architecture processor, or another type of processor). A memory 304, such as a random access memory (RAM), a Flash memory, or other type of memory, is typically accessible to the processor 302. The memory 304 may be adapted to store an operating system (OS) 306, as well as application programs 308, such as a mobile location enabled application that can provide location-based services a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 can be coupled to a transceiver 314 that interfaces with an antenna 316. The transceiver 314 may be configured to both transmit and receive cellular network signals, wireless data signals, or other types of signals via the antenna 316, depending on the nature of the mobile device 900. Further, in some configurations, a GPS receiver 318 may also make use of the antenna 316 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, these any such hybrid embodiments are within the scope of the present disclosure.

Figure 4:
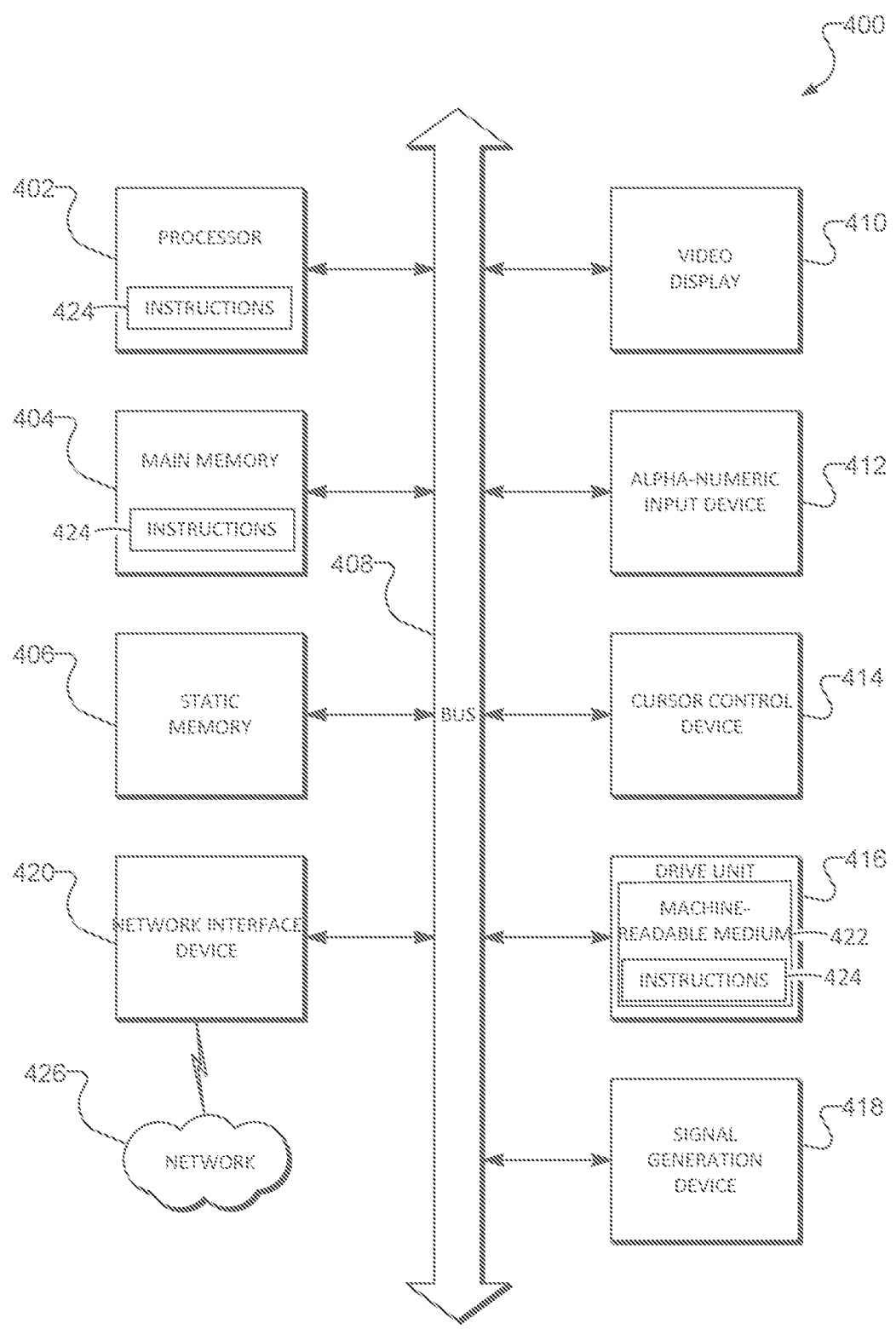
FIG. 4 is a block diagram illustrating components of a machine, according to some example embodiments, able to read instructions from a machine-readable medium and perform any one or more of the methodologies discussed herein, according to aspects of the disclosure.

FIG. 4 is a block diagram illustrating components of a machine, according to some example embodiments, able to read instructions from a machine-readable medium and perform any one or more of the methodologies discussed herein, according to aspects of the disclosure. In particular, FIG. 4 illustrates an exemplary computer system 400 within which instructions 424 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control) device 414 (e.g., a mouse), a disk drive unit 416, a signal generation device 418 (e.g., a speaker) and a network interface device 420.

The disk drive unit 416 includes a non-transitory machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting non-transitory, machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Figure 5:
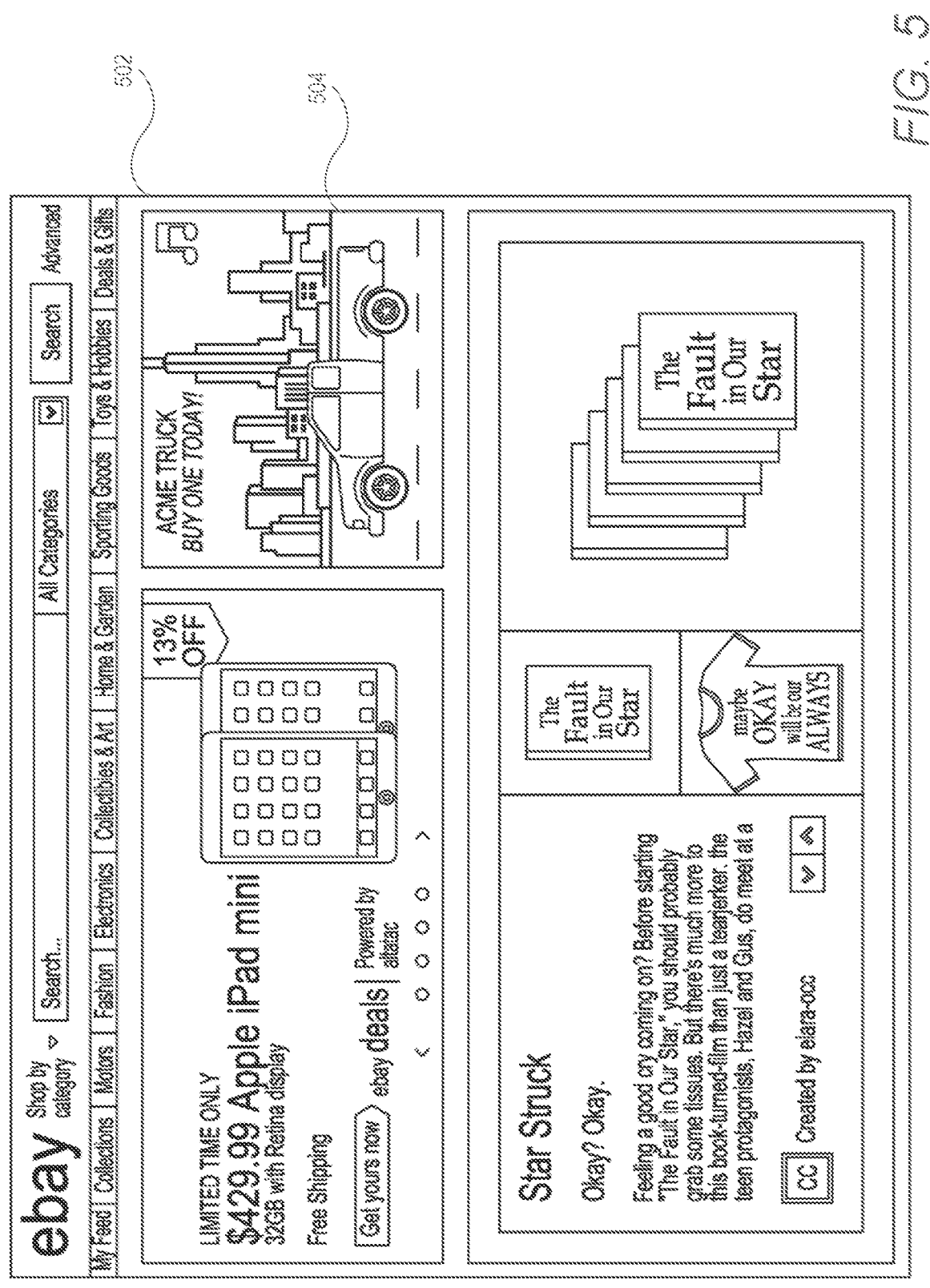
FIG. 5 illustrates a web page having advertising content and non-advertising content according to aspects of the disclosure.

FIG. 5 illustrates a web page 502 having advertising content and non-advertising content according to aspects of the disclosure. The web page 502 may be transmitted by the network system 102 in reply to a request for the web page by one or more of the client machines 110-112 and/or the third-party server 130. As shown in FIG. 5, the web page 502 is a homepage for a website, namely, ebay.com®. However, the provided web page 502 may be a web page for any portion of the web site visitable by the user, including a web page for a virtual store, a web page for a product and/or service being auctioned, a web page provided in response to a search for a product and/or service, and other such web pages.

The advertising content of the web page 502 may include various advertisements provided by the advertisement application 132. In one embodiment, the advertisement application 132 may transmit a user customizable advertisement 504 that is then embedded in the web page 502. Exemplary technologies for embedding the user customizable advertisement 504 include HTML5 and Adobe Flash®. Of course, other technologies that provide a multimedia experience and accept user input may also be used, such as Microsoft Silverlight® or a JAVA applet.

As discussed previously, the selection of the user customizable advertisement 504 may be based on one or more factors, such as the region of the user, the particular web page being viewed at the time, and one or more user preferences. As a user may provide login credentials to the web site, the advertisement application 132 may select and/or provide a user customizable advertisement 504 based on the provided login credentials. The information accessible by the advertisement application 132 based on the login credentials may include information previously provided by the user, such as geolocation information (e.g., a hometown or other address), information obtained by other applications (e.g., products and/or services previously viewed by the user via one or more marketplace application (s) 120, products and/or services previously purchased by the user via one or more payment application(s) 122, etc.), and other such information.

Figure 6:
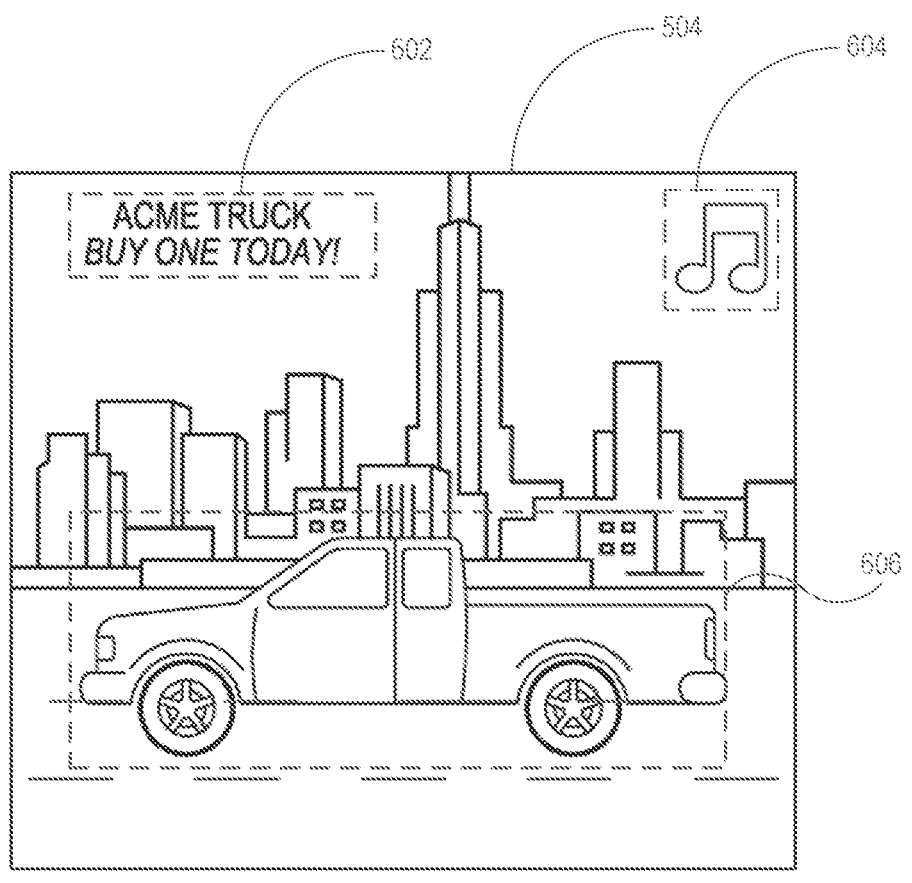
FIG. 6 illustrates a user customizable web advertisement according to aspects of the disclosure.

FIG. 6 illustrates the user customizable advertisement 504 that may be embedded into a web page (e.g., web page 502). As discussed previously, the user customizable advertisement 504 may include customizable portions 602-606 and non-customizable portions. Examples of non-customizable portions may include background elements (e.g., colors, graphics, sound, etc.), foreground elements (e.g., graphics, text, sound, etc.), and other such elements. Customizable portions may include any combination of objects used in the customizable advertisement, such as text (including formatting and substantive content), graphics, video, sound, programmatic elements (e.g., animation paths, timing controls, etc.), and other such objects. As shown in FIG. 6, the customizable portions 602-606 of the customizable advertisement 504 include a text object 602, a soundtrack 604 (which may be playing during the display of the customizable advertisement 504), and a graphic object 606.

The portions of the customizable advertisement 504 that are selected as customizable may be predetermined or selected based on various factors. In one embodiment, the customizable advertisement 504 is designed with one or more customizable portions such that the customizable advertisement 504 is provided to one or more client machines with the designed customizable portions. In other embodiment, the portions of the customizable advertisement that are selected as customizable may be based on the client machine. For example, a mobile device may be provided with a customizable advertisement that has less or different customizable portions than a customizable advertisement provided to a desktop computer. As one of ordinary skill in the art would understand, a mobile device typically has less computing resources available to it than a desktop computer (e.g., slower processor, smaller display, smaller or less speakers, etc.).

When the client machine initially requests the web page, the client machine may provide an identifier of the web browser making the request. The web browser identifier may signal to the advertisement application 132 the type of client machine making the request, e.g., a mobile device, a laptop computer, a desktop computer, a tablet computer, etc. The advertisement application 132 would then provide the customizable advertisement 504 having customizable portions based on the received identifier. In one embodiment, the customizable portions of the customizable advertisement 504 may be associated with various identifiers, such that the received identifier is matched or compared with the identifiers associated with the customizable portions. In one example, the customizable portions may be associated with their corresponding identifiers using a key/value pairing and stored in one or more databases 126. In this manner, the customizable portion corresponding to the text object 602 may be associated with a desktop computer identifier and a mobile device identifier, but the customizable portion corresponding to the soundtrack object 604 may be associated with the desktop computer identifier. Thus, when a web browser executing on a desktop computer requests the web page, the advertisement application 132 may provide the customizable advertisement with the text object 602 and soundtrack object 604 as customizable portions, but when a web browser executing on a mobile device requests the web page, the advertisement application 132 may provide the customizable advertisement with only the text object 602 as a customizable portion. While the customizable advertisement 504 may still have a soundtrack when it is delivered to the web browser of the mobile device, the soundtrack may not be customizable.

Furthermore, the identifier associated with the customizable portion need not be a generic identifier (e.g., mobile device, desktop computer, etc.) but may be specific to a given make and/or model of client machine (e.g., a specific make/model of mobile device, a specific make/model of desktop computer). Accordingly, a mobile device made today may have more computing resources, and thus may support more customizable portions, than a mobile device manufactured several years ago.

Figure 7:
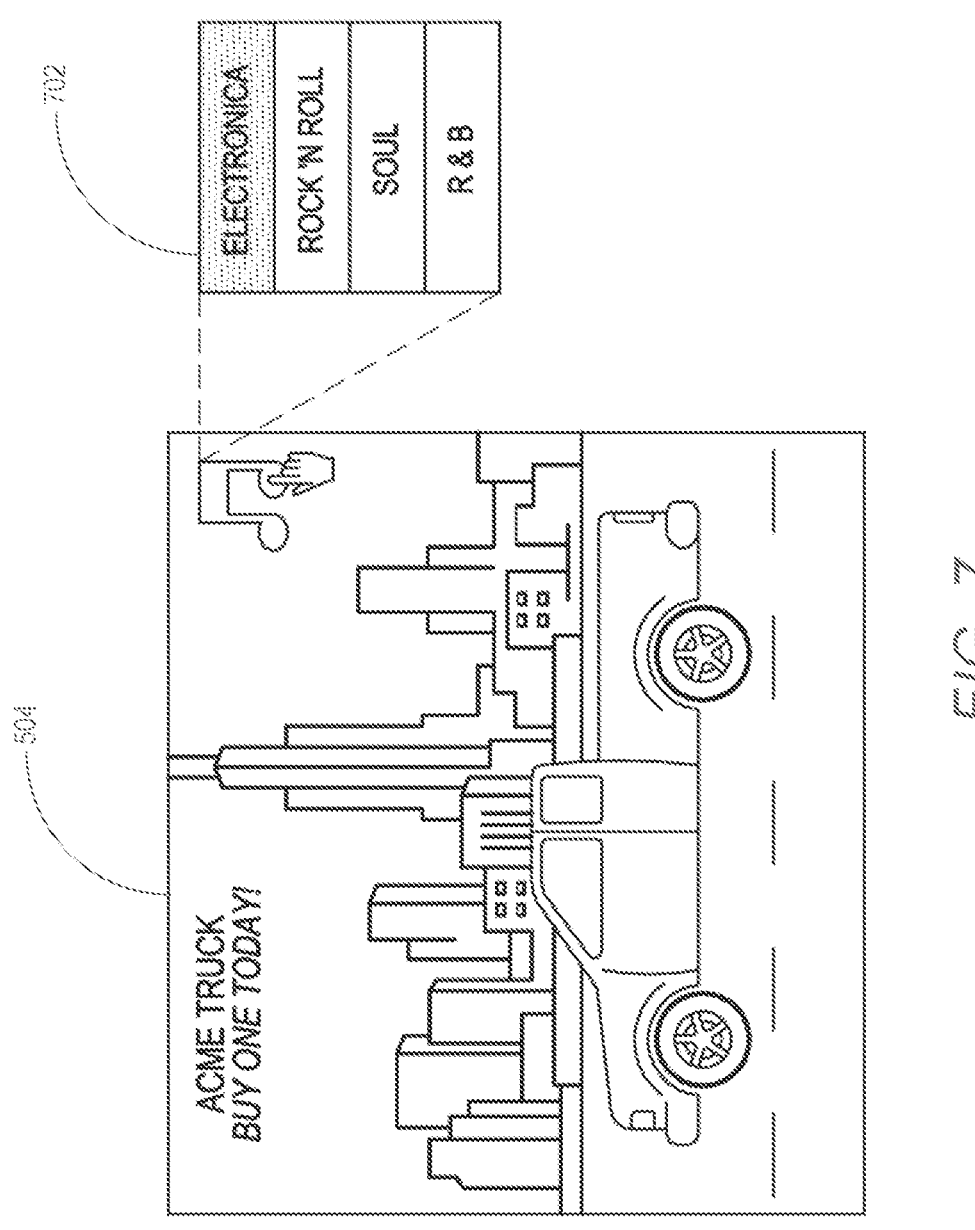
FIG. 7 illustrates customizing a first customizable portion of the user customizable web advertisement of FIG. 6 according to aspects of the disclosure.
Figure 8:
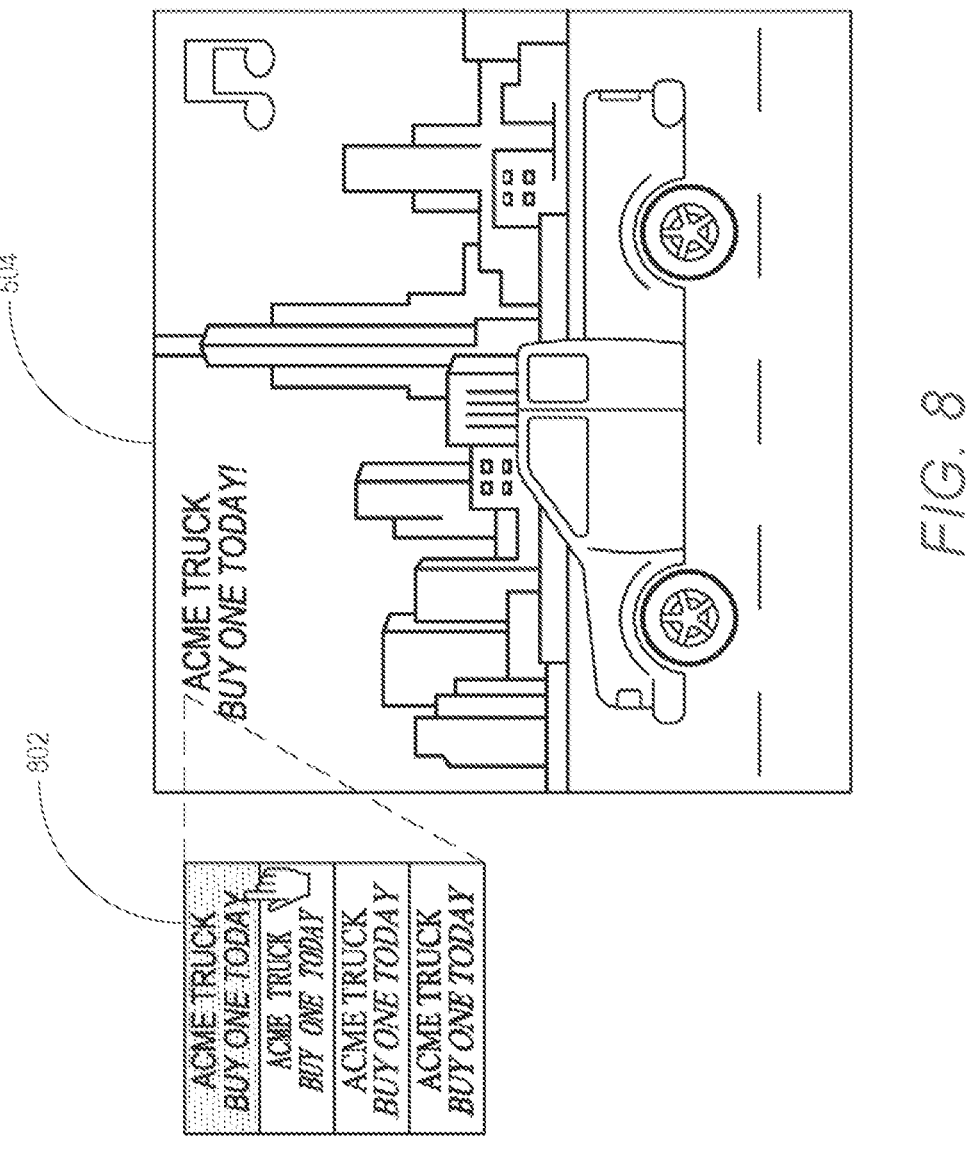
FIG. 8 illustrates customizing a second customizable portion of the user customizable web advertisement of FIG. 6 according to aspects of the disclosure.
Figure 9:
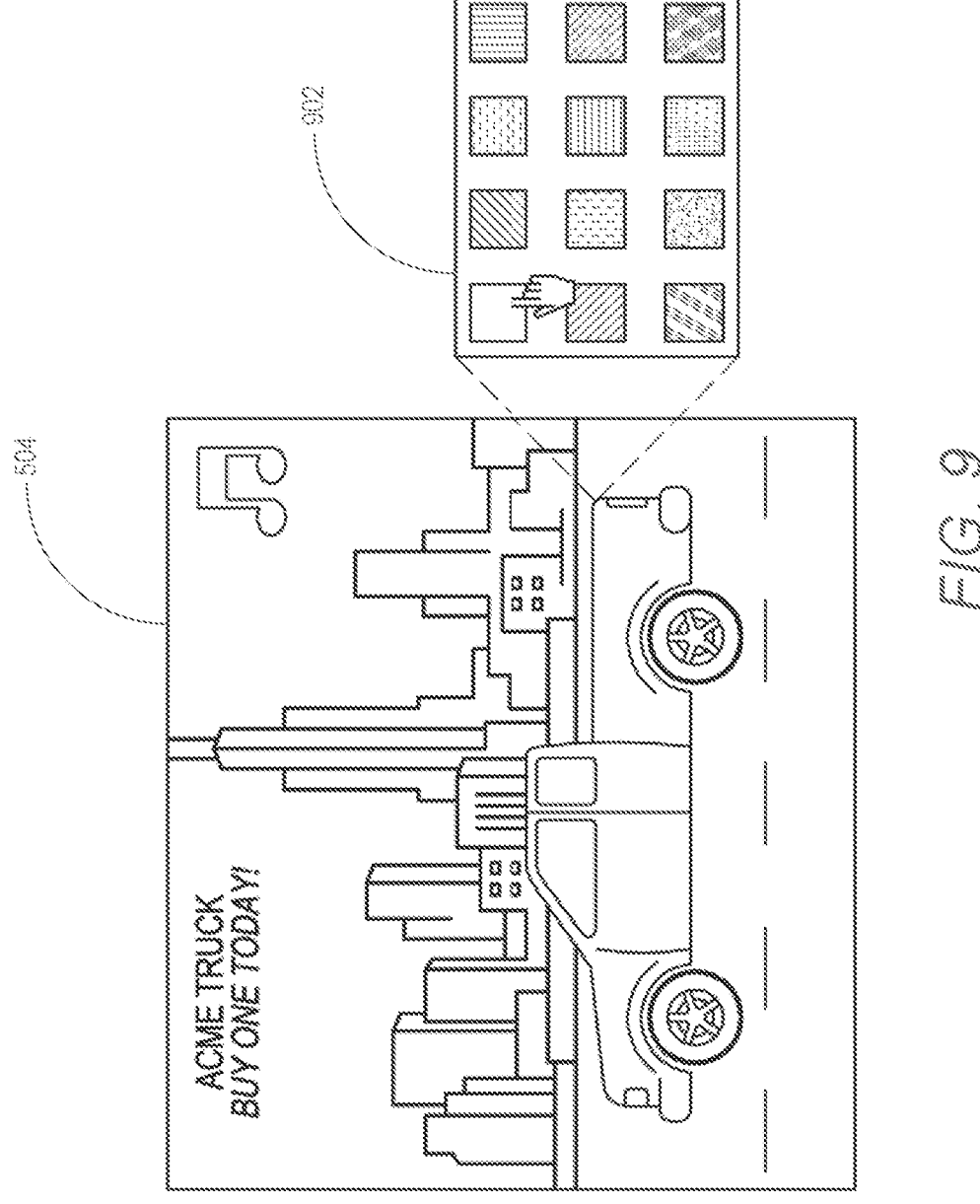
FIG. 9 illustrates customizing a third customizable portion of the user customizable web advertisement of FIG. 6 according to aspects of the disclosure.

FIGS. 7-9 illustrate various customizable options selectable by a user for a corresponding customizable portion. As shown in FIG. 7, a user may be presented with one or more soundtrack options 702 when the soundtrack object 604 is selected. As shown in FIG. 8, a user may be presented with one or more textual options 802 when the text object 602 is selected. The textual options may include substantive options (e.g., changing the substance of the text shown in the text object 602), formatting options (e.g., changing the font or font size used to the display the text object 602), or combinations thereof. As shown in FIG. 9, a user may be presented with one or more graphical options 902 when the graphic object 606 is selected. The graphical options 902 may include formatting options (e.g., the placement of the graphic object 606, the size of the graphic object 606, etc.), substantive options (e.g., the color of the graphic object 606, the actual graphic used in displaying the graphic object 606, etc.) or combinations thereof.

After the customization options are selected, the customizable advertisement 504 may be displayed on the client machine with the selected customization options. Furthermore, the customization options that are selected may be stored on the client machine for future reference or use by the advertisement application 132. In one embodiment, each of the customization options may be associated with a corresponding customization identifier, and the one or more customization identifiers may be stored on the client machine, such as in a browser cookie, file, or other storage mechanism. In this manner, the client machine does not need to store the assets used in displaying the customizable advertisement (i.e., the graphics, sounds, texts, programmatic content, etc.), but only an identifier corresponding to the selected customization option. Furthermore, the selected customization options may be used to automatically configure future advertisements for that same user (e.g., if "Jazz" is selected as a music option for a given advertisement, that selection may be used to provide advertisements having similar music or to select similar music as a default option when providing other advertisements).

Furthermore, in later displays of the customizable advertisement, the advertisement application 132 may retrieve the customization identifiers stored in the browser cookie (or other storage mechanism), and apply the customization options corresponding to those identifiers in the later-displayed advertisement. Thus, when the customizable advertisement is displayed, the user is shown a customizable advertisement with the customization options already applied. While the user may choose to change those customization options, this implementation has the advantage of providing an advertisement having features that the user has already found desirable or likeable.

In addition, other customizable advertisements (e.g., different or alternative customizable advertisements) may have customizable options that are associated with the selected customization identifiers. Thus, when the different or alternative customizable advertisements are displayed, the different or alternative customizable advertisements are displayed with customization options that the user may find desirable or enjoyable.

Moreover, as customization identifiers are stored on the client machine while the advertisement assets may remain on a server or database (e.g., application server 118, advertisement publication server 134, database(s) 126, etc.), this implementation has the advantage of reducing the computing resources needed by the client machine to retain the customization options selected by the user. However, in alternative implementations, the assets for the customizable advertisement may be stored on the client machine, such as where it is determined that the client machine has the resources to retain such assets.

Figure 10:
FIG. 10 illustrates publication and sharing options that may be presented to the user after customizing the user customizable web advertisement of FIG. 6 according to aspects of the disclosure.

After the display of the customized advertisement 504 is complete, or any time the user is satisfied with the customized options selected for the customized advertisement 504, the user may elect to publish or share the customized advertisement 504. FIG. 10 illustrates exemplary publication and sharing options that may be presented to the user according to aspects of the disclosure. In one embodiment, where a publication option 1002 is selected, the customized advertisement is communicated to the advertisement publication server 134 such that the customized advertisement 504 may be viewable by other users. In particular, the client machine may transmit the customization identifiers corresponding to the selected customization options to the advertisement publication server 134, and the advertisement publication server 134 may provide a customized advertisement have the selected customization options based on the transmitted customization identifiers.

In another embodiment, where the sharing option 1004 is selected, the customized advertisement may be communicated to the advertisement publication server 134 as discussed above, and the user may be provided with a Uniform Resource Locator (URL) where the customized advertisement may be located. The provided URL may be unique to the user and/or the customized advertisement such that, when the URL is entered into a web browser, the web browser is directed to the customized advertisement hosted by the advertisement publication server 134. In this manner, the user may share his or her customized advertisement with other users.

Figure 11:
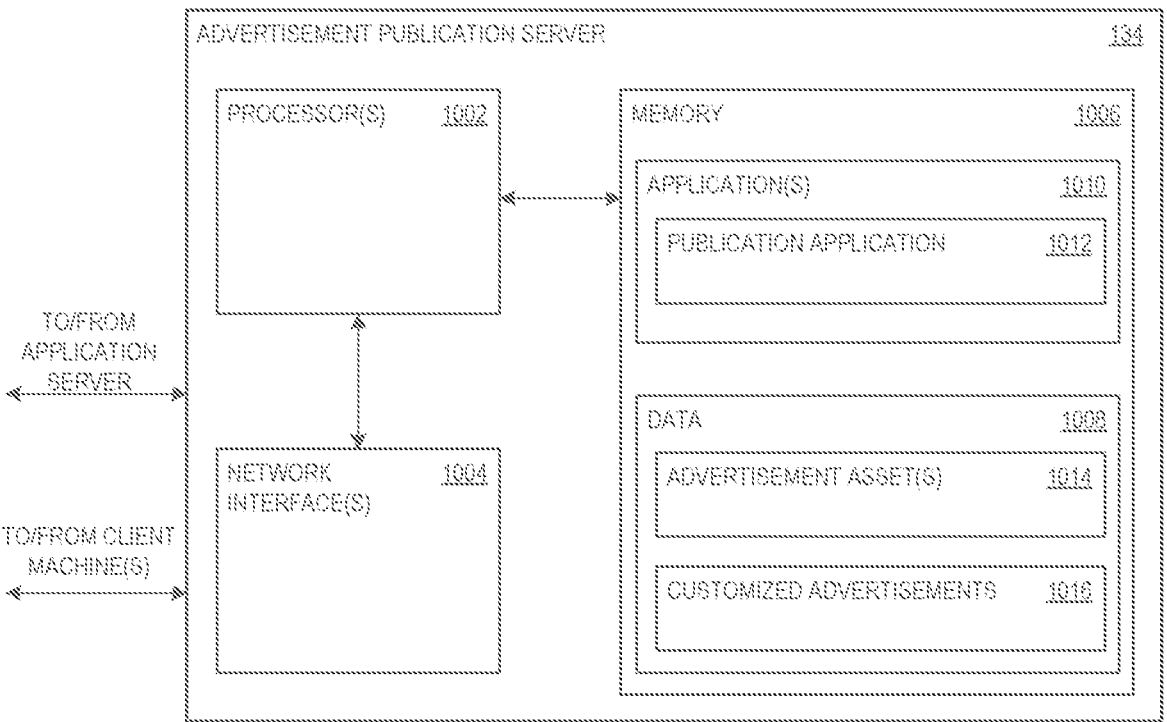
FIG. 11 illustrates an exemplary advertisement publication server according to aspects of the disclosure.

FIG. 11 illustrates an exemplary advertisement publication server according to aspects of the disclosure. In particular, FIG. 4 shows that the advertisement publication server 134 may have one or more applications 1010 that cause the advertisement publication server 134 to perform any one or more of the methodologies discussed herein, The advertisement publications server 134 may operate as a standalone device or may be connected (e.g., networked) to other machines. In a networked deployment, the advertisement publication server 134 may operate in the capacity of a server or a client machine in a server-client network environment, or as a peer machine in a peer-to-peer (or distributed) network environment.

The advertisement publication server 134 may include one or more processors 1002 (e.g., a central processing unit (CPU), a graphics processing unit (GPU) or both), one or more network interface(s) 1004, and a non-transitory, computer-readable memory 1006. The non-transitory, computer-readable memory 1006 may include one or more application(s) 1010, such as a publication application 1012. The publication application 1012 may facilitate the publication of one or more customized advertisements 1016, such as by providing an interface (e.g., a web page or programmatic interface), where one or more customized advertisements 1016 may be viewable or accessible by one or more users. The advertisement publication server 134 may also include data 1008, which may include the advertisement asset(s) 1014 and customized advertisements 1016. In one embodiment, the customized advertisements 1016 are movies, having been rendered with a suitable video codec (if applicable) and/or a suitable audio codec (if applicable), where the advertisement publication server 134 has rendered the customized advertisements 1016 using the advertisement asset(s) 1014 and the previously selected customization identifiers. Alternatively, the customized advertisements 1016 are provided in their initial format (e.g., as Flash® object, Silverlight® object, HTML5 object, etc.), and the advertisement publication server 134 displays the customized advertisements 1016 with the selected customization options based on the received customization identifiers. In this alternative embodiment, the advertisement publication server 134 uses reduced computing resources as it may not apply one or more video and/or audio codecs to the customized advertisements.

Figure 12A:
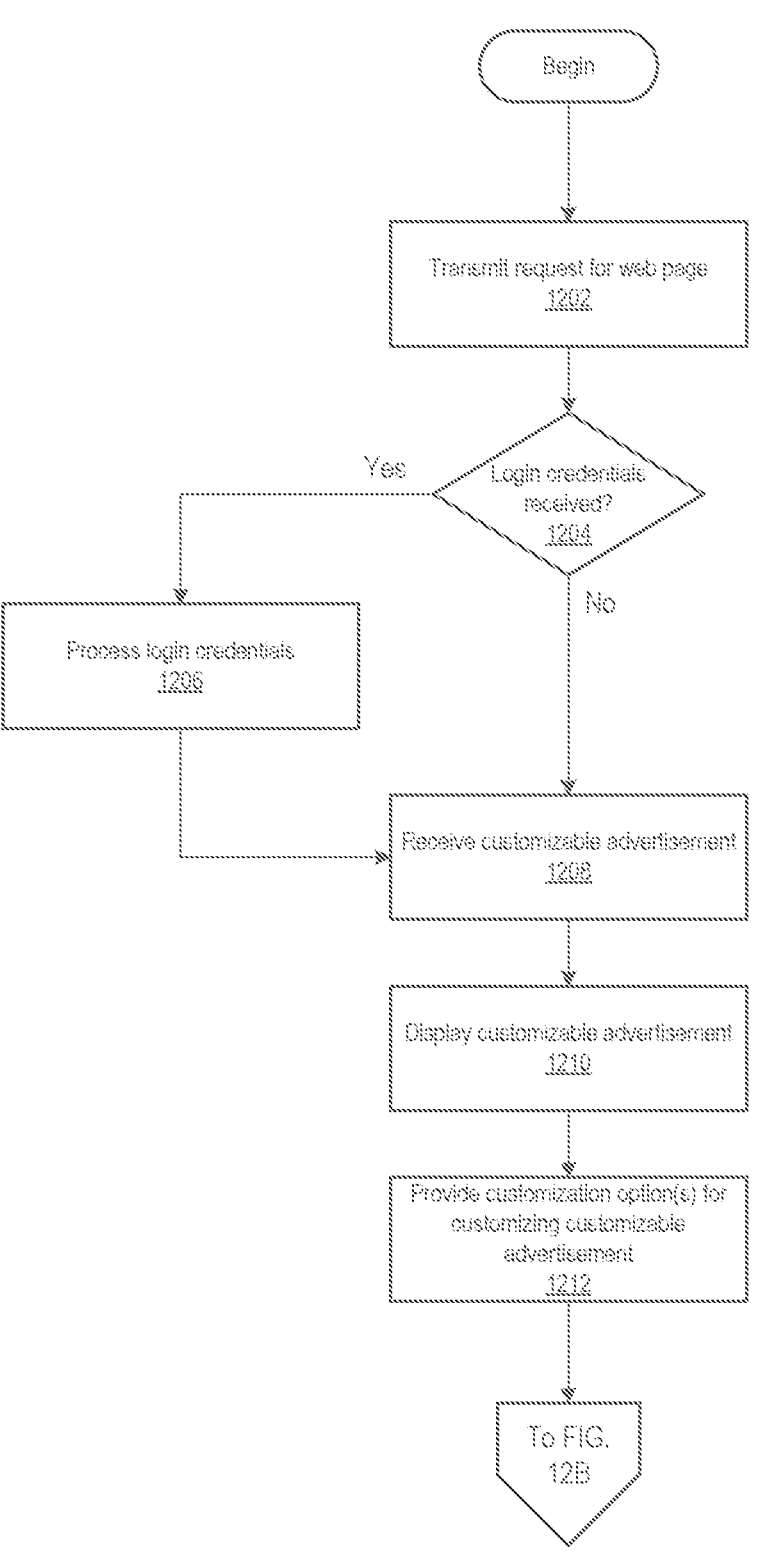
FIG. 12A-12C illustrates an exemplary logic flow for customizing a user customizable web advertisement according to aspects of the disclosure.
Figure 12B:
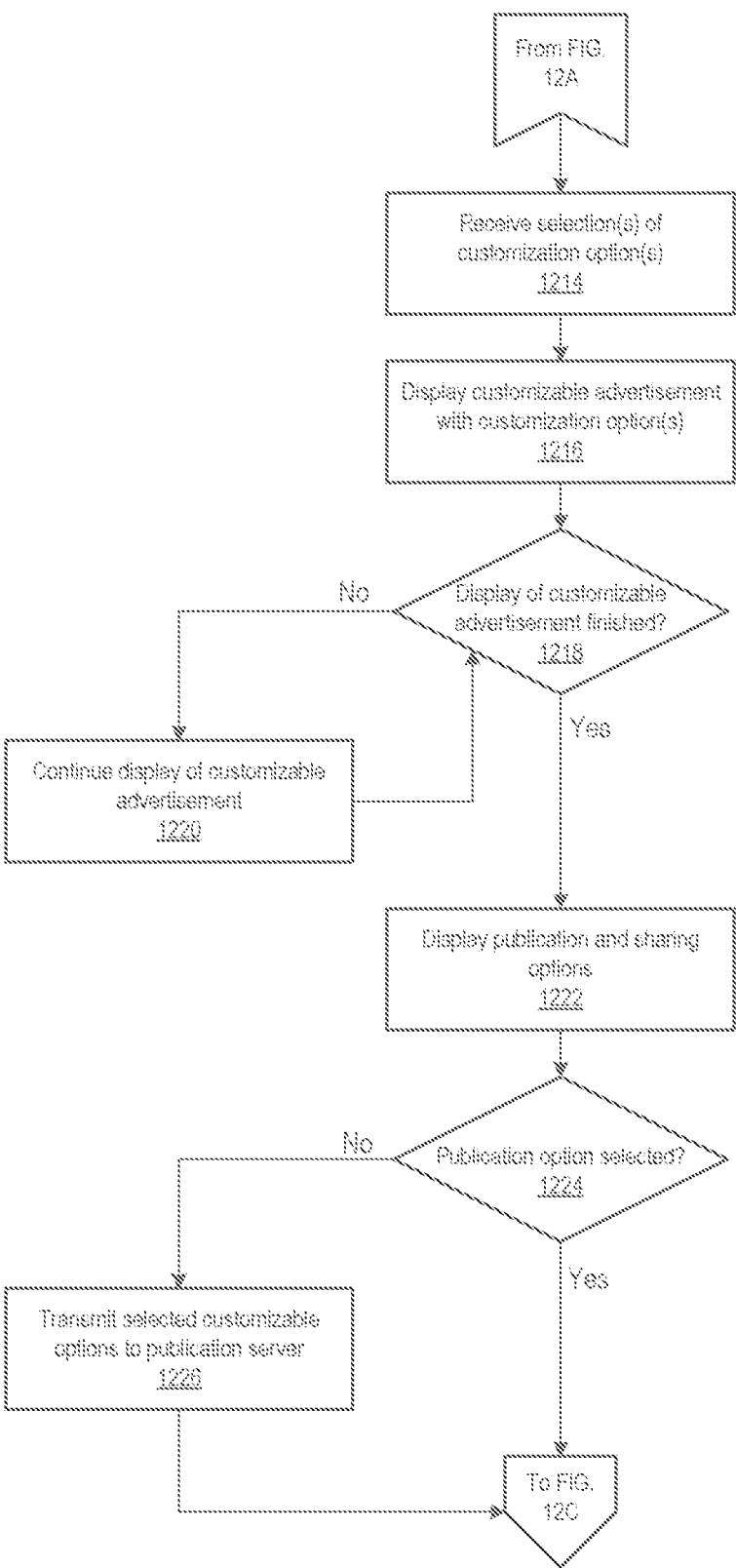
Figure 12C:
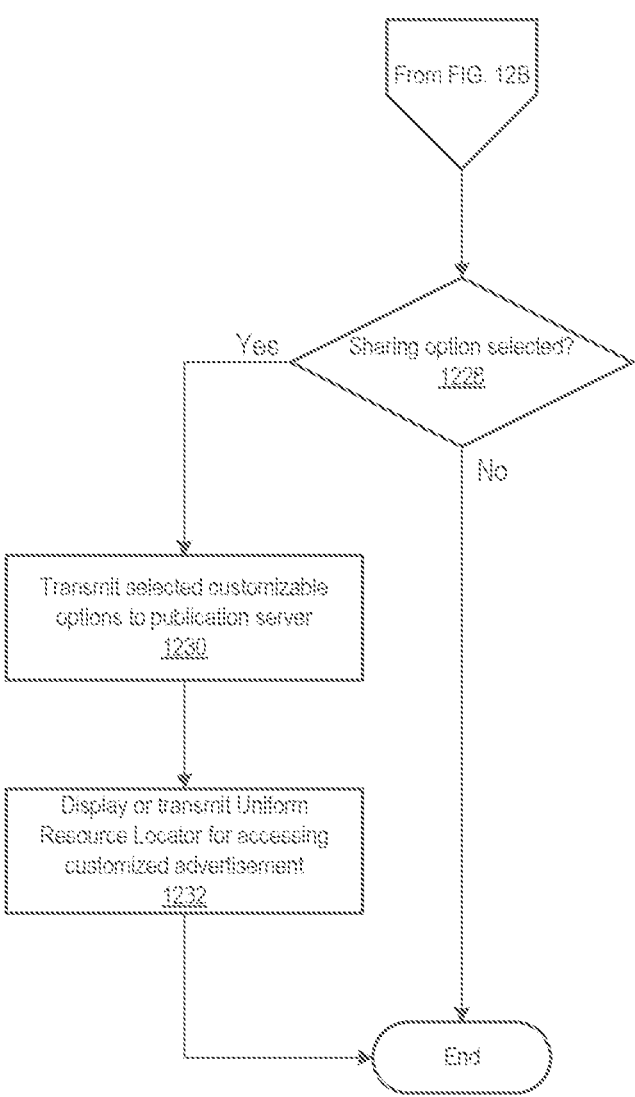

FIG. 12A-12C illustrates an exemplary logic flow for customizing a user customizable web advertisement according to aspects of the disclosure. Initially, a client machine may request a web page from the networked system 102, such as via the web server 116 (Block 1202). However, the client machine may also request resources via the API server 114.

It is then determined whether the client machine has provided login credentials for the user (Block 1204). As discussed previously, the advertisement application 132 may leverage provided login credentials to display and/or provide a customizable advertisement tailored to one or more user preferences or based on a user profile. Where login credentials have been received, the advertisement application 132 may process those login credentials as discussed above (Block 1206). Where login credentials have not been received, the advertisement application 132 may select a customizable advertisement based on other factors, such as the web page requested by the client machine, or may select a default or random customizable advertisement for display. Similarly, and as discussed previously, the advertisement application 132 may select suitable and/or appropriate customization options for the customizable advertisement.

The advertisement application 132 then provides the customizable advertisement and the client machine receives it accordingly (Block 1208). The client machine may then display the customizable advertisement (Block 1210). During the display of the customizable advertisement, one or more customizable options may be displayed (Block 1212). For example, and as discuss previously, a user may select a customization portion of the customizable advertisement and one or more customization options for customizing the customizable portion may be displayed. The user may then select one or more customization options, such as by clicking the customization option with a cursor (Block 1214). In other embodiments, the user may use another input interface to select a customization option, such as by pressing a button of a graphical keyboard (i.e., a "soft" keyboard). In turn, the web browser may then display the customized advertisement with the selected customization options (Block 1216).

It is then determined whether the display of the customized advertisement has finished (Block 1218). Alternatively, the user may select an option to indicate that he or she is done viewing the customized advertisement. Where the display of the customizable advertisement is not finished, the web browser may continue its display of the customized advertisement (Block 1220). However, after the display of the customized advertisement, one or more publication and/sharing options may be displayed (Block 1222). A determination is then made as to whether the user has selected the publication option (Block 1224). Where the user has selected the publication option, the customization options selected by the user may then be transmitted to the advertisement publication server 134 so that the advertisement publication server 134 can provide the user's version of the customizable advertisement (Block 1226). A determination may also be made for whether the user has selected the sharing option (Block 1228). Where the user has selected the sharing option, the customization options selected by the user may then be transmitted to the advertisement publication server 134 as discussed previously (Block 1230), but the client machine may also display or URL where the user can access the customized advertisement (Block 1232).

In this manner, the foregoing systems and methods provide an environment where a user can engage, and be more engaged with, advertisements that are provided in the course of the user's online experience. In addition, the technology leveraged in this environment may reduce the computing resources used by a client machine in customizing a customizable advertisement and, further still, make it possible for the user to share his or her customized advertisements with other users. By publishing and/or sharing a customized advertisement, there is an increased likelihood that other users will view the advertised products and/or services, which also increases the probability that a user purchases the advertised products and/or services.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving, at a server of a network system from a first client device, a web page request, the web page request including an identifier that indicates a device type of the first client device;

in response to receiving the request, causing an advertisement application at the server to provide a customized advertisement along with the requested web page by performing operations comprising:

identifying, by the advertisement application, the device type based on the identifier;

based on the device type, determining, by the advertisement application, a set of one or more customizable portions within an interactive advertisement that corresponds to the device type by comparing the identifier to identifiers associated with the customizable portions of the interactive advertisement to find matches, each device type having a different corresponding set of one or more customizable portions based on available computing resources;

generating the web page by embedding the interactive advertisement having the set of one or more customizable portions determined based on the matching of the identifier with identifiers associated with the customization portions and a plurality of customization options for each customizable portion into the web page using a web-based multimedia framework selected based on the device type, the framework configured to optimize resource usage on the client device by offloading customization asset storage and processing to the server; and causing the first client device to display the web page that includes non-advertisement content and the interactive advertisement embedded therein, the first client device generating and displaying a customized interactive advertisement on the web page that includes the non-advertisement content by applying a customization option selected from the plurality of customization options to the set of one or more customizable portions, the selected customization option having a corresponding customization identifier;

retaining, at the server, assets corresponding to the customization identifier of the selected customization option, the first client device only storing the corresponding customization identifier corresponding to the selected customization option in a browser cookie and not the assets, thereby reducing client-side storage and processing requirements; and automatically applying, by the server, the assets of the selected customization option to a subsequent interactive advertisement without a further user selection by retrieving the corresponding customization identifier stored in the browser cookie and dynamically assembling the subsequent interactive advertisement by applying the customization option corresponding to the corresponding customization identifier.

2. The method of claim 1, wherein the device type is based on a make and model of the first client device.

3. The method of claim 1, wherein the assets used in displaying the customizable advertisement comprise one or more of graphics, sounds, texts, or programmatic content.

4. The method of claim 1, further comprising:

selecting the interactive advertisement based on information accessible based on login credentials of a user of the first client device.

5. The method of claim 1, wherein the automatically applying comprises comparing the corresponding customization identifier to customization identifiers stored at the server to find a matching identifier of the customization option.

6. The method of claim 1, wherein the automatically applying comprises retrieving, by the server, the assets of the selected customizable option in response to a subsequent request associated with the subsequent interactive advertisement.

7. The method of claim 1, further comprising:

receiving, from the first client device, an indication to publish a customized advertisement generated at the first client device, the indication including customization identifiers corresponding to one or more selected customization options; and providing the customized advertisement to a second client device.

8. The method of claim 1, further comprising:

receiving, from the first client device, an indication to share a customized advertisement generated at the first client device, the indication including customization identifiers corresponding to one or more selected customization options;

generating a Uniform Resource Locator (URL) unique to the user or the customized advertisement; and providing the URL to the first client device that indicates where the customized advertisement is located.

9. The method of claim 1, wherein:

the set of one or more customizable portions comprises a soundtrack object; and the plurality of customization options includes a plurality of songs.

10. The method of claim 1, wherein:

the set of one or more customizable portions comprises a text object; and the plurality of customization options includes substantive options to change a substance of text shown in the text object or formatting options to change a font or font size used to display the text object.

11. The method of claim 1, wherein:

the set of one or more customizable portions comprises a graphic object; and the plurality of customization options includes substantive options to change a graphic used in displaying the graphic object or formatting options to change a placement or size of the graphic object.

12. A system comprising:

one or more processors; and a memory storing instructions that, when executed by the one or more processors, cause the one or more processors to perform operations comprising:

receiving, from a first client device, a web page request, the web page request including an identifier that indicates a device type of the first client device;

in response to receiving the request, causing an advertisement application at a server to provide a customized advertisement along with the requested web page by performing operations comprising:

identifying the device type based on the identifier;

based on the device type, determining a set of one or more customizable portions within an interactive advertisement that corresponds to the device type by comparing the identifier to identifiers associated with the customizable portions of the interactive advertisement to find matches, each device type having a different corresponding set of one or more customizable portions based on available computing resources;

generating the web page by embedding the interactive advertisement having the set of one or more customizable portions determined based on the matching of the identifier with identifiers associated with the customization portions and a plurality of customization options for each customizable portion into the web page using a web-based multimedia framework selected based on the device type, the framework configured to optimize resource usage on the client device by offloading customization asset storage and processing to the server; and causing the first client device to display the web page that includes non-advertisement content and the interactive advertisement embedded therein, the first client device generating and displaying a customized interactive advertisement on the web page that includes the non-advertisement content by applying a customization option selected from the plurality of customization options to the set of one or more customizable portions, the selected customization option having a corresponding customization identifier;

retaining, at the server, assets corresponding to the customization identifier of the selected customization option, the first client device only storing the corresponding customization identifier corresponding to the selected customization option in a browser cookie and not the assets, thereby reducing client-side storage and processing requirements; and automatically applying, by the server, the assets of the selected customization option to a subsequent interactive advertisement without a further user selection by retrieving the corresponding customization identifier stored in the browser cookie and dynamically assembling the subsequent interactive advertisement by applying the customization option corresponding to the corresponding customization identifier.

13. The system of claim 12, wherein the device type is based on a make and model of the first client device.

14. The system of claim 12, wherein the assets used in displaying the customizable advertisement comprise one or more of graphics, sounds, texts, or programmatic content.

15. The system of claim 12, wherein the operations further comprise:

selecting the interactive advertisement based on information accessible based on login credentials of a user of the first client device.

16. The system of claim 12, wherein the automatically applying comprises comparing the corresponding customization identifier to customization identifiers stored at the server to find a matching identifier of the customization option.

17. The system of claim 12, wherein the automatically applying comprises retrieving, by the server, the assets of the selected customizable option in response to a subsequent request associated with the subsequent interactive advertisement.

18. The system of claim 12, wherein the operations further comprise:

receiving, from the first client device, an indication to publish a customized advertisement generated at the first client device, the indication including customization identifiers corresponding to one or more selected customization options; and providing the customized advertisement to a second client device.

19. The system of claim 12, wherein the operations further comprise:

receiving, from the first client device, an indication to share a customized advertisement generated at the first client device, the indication including customization identifiers corresponding to one or more selected customization options;

generating a Uniform Resource Locator (URL) unique to the user or the customized advertisement; and providing the URL to the first client device that indicates where the customized advertisement is located.

20. A non-transitory machine-storage medium storing a set of instructions that, when executed by one or more processors, causes the one or more processors to perform operations comprising:

receiving, from a first client device, a web page request, the web page request including an identifier that indicates a device type of the first client device;

in response to receiving the request, causing an advertisement application at a server to provide a customized advertisement along with the requested web page by performing operations comprising:

identifying the device type based on the identifier;

based on the device type, determining a set of one or more customizable portions within an interactive advertisement that corresponds to the device type by comparing the identifier to identifiers associated with the customizable portions of the interactive advertisement to find matches, each device type having a different corresponding set of one or more customizable portions based on available computing resources;

generating the web page by embedding the interactive advertisement having the set of one or more customizable portions determined based on the matching of the identifier with identifiers associated with the customization portions and a plurality of customization options for each customizable portion into the web page using a web-based multimedia framework selected based on the device type, the framework configured to optimize resource usage on the client device by offloading customization asset storage and processing to the server; and causing the first client device to display the web page
that includes non-advertisement content and the
interactive advertisement embedded therein, the first
client device generating and displaying a customized
interactive advertisement on the web page that
includes the non-advertisement content by applying
a customization option selected from the plurality of
customization options to the set of one or more
customizable portions, the selected customization
option having a corresponding customization identifier;

retaining, at the server, assets corresponding to the cus-
tomization identifier of the selected customization
option, the first client device only storing the corre-
sponding customization identifier corresponding to the
selected customization option in a browser cookie and
not the assets, thereby reducing client-side storage and
processing requirements; and automatically applying, by the server, the assets of the
selected customization option to a subsequent interactive advertisement without a further user selection by
retrieving the corresponding customization identifier
stored in the browser cookie and dynamically assem-
bling the subsequent interactive advertisement by
applying the customization option corresponding to the
corresponding customization identifier.

*    *    *    *    *